US010878250B2

(12) United States Patent
Kernwein

(10) Patent No.: US 10,878,250 B2
(45) Date of Patent: Dec. 29, 2020

(54) DETERMINING PRESENCE OF A RAIL VEHICLE ON A TRACK BASED ON IMAGE DATA

(71) Applicant: Westinghouse Air Brake Technologies Corporation, Wilmerding, PA (US)

(72) Inventor: Jeffrey D. Kernwein, Cedar Rapids, IA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 86 days.

(21) Appl. No.: 16/225,707

(22) Filed: Dec. 19, 2018

(65) Prior Publication Data

US 2020/0202132 A1 Jun. 25, 2020

(51) Int. Cl.
*G06T 7/00* (2017.01)
*G06K 9/00* (2006.01)

(52) U.S. Cl.
CPC ..... *G06K 9/00771* (2013.01); *G06K 9/00744* (2013.01); *G06T 7/0002* (2013.01); *G06T 2207/30236* (2013.01); *G06T 2207/30252* (2013.01)

(58) Field of Classification Search
CPC ............ G06K 9/00771; G06K 9/00744; G06T 7/0002
See application file for complete search history.

(56) References Cited

U.S. PATENT DOCUMENTS

| 6,128,558 A | 10/2000 | Kernwein | |
|---|---|---|---|
| 2014/0085490 A1* | 3/2014 | Arai | H04N 5/23216 348/207.11 |
| 2020/0047785 A1* | 2/2020 | Fries | B61L 23/007 |

* cited by examiner

Primary Examiner — Sam Bhattacharya
(74) Attorney, Agent, or Firm — Christopher R. Carroll; The Small Patent Law Group LLC

(57) ABSTRACT

A system for determining a presence of a rail vehicle on a plurality of tracks that includes a first image capture device, a second image capture device, and at least one processor to receive first image data associated with a first image captured by the first image capture device, receive second image data associated with a second image captured by the second image capture device, determine a first track upon which a rail vehicle is predicted to be located based on the first image data associated with the first image, determine a second track upon which the rail vehicle is predicted to be located based on the second image data associated with the second image, and determine the track upon which the rail vehicle is located based on the first track and the second track. A method and computer program product are also disclosed.

17 Claims, 8 Drawing Sheets

DETERMINING PRESENCE OF A RAIL VEHICLE ON A TRACK BASED ON IMAGE DATA

BACKGROUND

1. Field

This disclosure relates generally to systems, devices, products, apparatus, and methods that are used for determining a presence of a rail vehicle on a track, in one particular embodiment, to a system, product, and method for determining a presence of a rail vehicle on a track of a plurality of tracks based on image data.

2. Technical Considerations

A train control system may be used to facilitate the operation of a rail vehicle (e.g., a train, a locomotive, a railroad car, a passenger car, a coach, a freight car, a wagon, etc.) on a track system. For example, a train control system may be used to provide for a density of rail vehicles on a track system while simultaneously maintaining separation between the rail vehicles (e.g., positive train separation) on a track (e.g., a railroad track, a train track, a set of rails, etc.).

However, it may be difficult to use a train control system to maintain a density of rail vehicles on a track system while maintaining separation between the rail vehicles based on a set of tracks in a track system. In some instances, a parallel set of tracks may exist with numerous cross-over switches for switching from one track to the other. It may be difficult for a train control system to determine, with an appropriate amount of certainty, which track of a parallel set of train tracks a rail vehicle may be located at a particular time interval. For example, when a first track and a second track are in parallel to each other, they may be placed very close to each other. In some instances, a center-to-center distance between the first track and the second track may be approximately fourteen feet. The distance between the first track and the second track may make it difficult for the train control system to determine, with an appropriate amount of certainty, the presence of the rail vehicle based on which track of the parallel set of train tracks the rail vehicle may be traveling upon at a particular time interval.

In some instances, global positioning system (GPS) receivers, track circuits and/or inertial navigation sensors may be used to determine a presence of a rail vehicle on a parallel set of tracks. However, GPS receivers may not be able to resolve the positioning of a rail vehicle to the appropriate amount of certainty. The separation of approximately fourteen (14) feet between tracks is often too close for which a GPS receiver is able to provide an accurate determination of the presence of a rail vehicle. In some instances, differential GPS may increase the accuracy of the presence at which the rail vehicle is determined to be located. However, differential GPS may require that numerous remotely located differential GPS transmitter stations be positioned throughout a geographic area.

In some instances, track circuits may be used to detect the presence of a rail vehicle on a track. However, track circuits may require significant infrastructure investment to provide comprehensive coverage. Additionally, track circuits may be subject to damage at remote locations and are susceptible to sabotage. In some instances, inertial navigation sensors may be used to determine a position of a rail vehicle on a track based on movement of the rail vehicle along the track. Inertial navigation sensors may include gyroscopes and/or acceleration sensors. While gyroscopes may be capable of sensing a gradual turn, gyroscopes with sufficient accuracy to sense gradual turns are expensive. Furthermore, acceleration sensors may be less expensive than gyroscopes. However, acceleration sensors may lack the ability to sense the movement of a rail vehicle. For example, acceleration sensors may lack the ability to sense the movement of the rail vehicle when a high speed switch is being made from a first track to a second track that is parallel to the first track at very low speeds. Additional ways to detect the presence of a rail vehicle on a track are disclosed in U.S. Pat. No. 6,128,558, which is herein incorporated by reference in its entirety.

SUMMARY

Accordingly, systems, devices, products, apparatus, and/or methods for determining a presence of a rail vehicle on a track of a plurality of tracks are disclosed that overcome some or all of the deficiencies of the prior art.

According to another non-limiting embodiment, provided is a system for determining a presence of a rail vehicle on a track of a plurality of tracks. The system includes a first image capture device, a second image capture device, and at least one processor. The at least one processor is programmed or configured to receive first image data associated with a first image captured by the first image capture device, receive second image data associated with a second image captured by the second image capture device, determine a first track of a plurality of tracks upon which a rail vehicle is predicted to be located based on the first image data associated with the first image captured by the first image capture device, determine a second track of the plurality of tracks upon which the rail vehicle is predicted to be located based on the second image data associated with the second image captured by the second image capture device, and determine a track of the plurality of tracks upon which the rail vehicle is located based on the first track of the plurality of tracks upon which the rail vehicle is predicted to be located and the second track of the plurality of tracks upon which the rail vehicle is predicted to be located.

According to a non-limiting embodiment, provided is a method for determining a presence of a rail vehicle on a track of a plurality of tracks. The method includes receiving, with at least one processor, first image data associated with a first image captured by a first image sensor, the first image sensor located at a first position on a rail vehicle; receiving, with at least one processor, second image data associated with a second image captured by a second image sensor, the second image sensor located at a second position, the second position being different than the first position, determining, with at least one processor, a first track of a plurality of tracks upon which the rail vehicle is predicted to be traveling based on the first image data associated with the first image captured by the first image sensor, determining, with at least one processor, a second track of the plurality of tracks upon which the rail vehicle is predicted to be traveling based on the second image data associated with the second image captured by the second image sensor, and determining, with at least one processor, a track of the plurality of tracks upon which the rail vehicle is traveling based on determining the first track of the plurality of tracks upon which the rail vehicle is traveling and determining the second track of the plurality of tracks upon which the rail vehicle is traveling.

According to a further non-limiting embodiment, provided is a computer program product for determining a presence of a rail vehicle on a track of a plurality of tracks.

The computer program product comprises at least one non-transitory computer-readable medium including one or more instructions that, when executed by at least one processor, cause the at least one processor to receive first image data associated with a first image captured by a first image capture device, receive second image data associated with a second image captured by a second image capture device, determine a first track of a plurality of tracks upon which a rail vehicle is predicted to be located based on the first image data associated with the first image captured by the first image capture device, determine a second track of the plurality of tracks upon which the rail vehicle is predicted to be located based on the second image data associated with the second image captured by the second image capture device, and determine a track of the plurality of tracks upon which the rail vehicle is located based on the first track of the plurality of tracks upon which the rail vehicle is predicted to be located and the second track of the plurality of tracks upon which the rail vehicle is predicted to be located.

Further embodiments or aspects are set forth in the following numbered clauses:

Clause 1: A system for determining a presence of a rail vehicle on a track of a plurality of tracks, comprising: a first image capture device; a second image capture device; and at least one processor programmed or configured to: receive first image data associated with a first image captured by the first image capture device; receive second image data associated with a second image captured by the second image capture device; determine a first track of a plurality of tracks upon which a rail vehicle is predicted to be located based on the first image data associated with the first image captured by the first image capture device; determine a second track of the plurality of tracks upon which the rail vehicle is predicted to be located based on the second image data associated with the second image captured by the second image capture device; and determine a track of the plurality of tracks upon which the rail vehicle is located based on the first track of the plurality of tracks upon which the rail vehicle is predicted to be located and the second track of the plurality of tracks upon which the rail vehicle is predicted to be located.

Clause 2: The system of clause 1, wherein the rail vehicle is a first rail vehicle of a rail vehicle system, wherein the first image capture device is located at a location on the first rail vehicle, and the second image capture device is located at a location on a second rail vehicle of the rail vehicle system.

Clause 3: The system of clauses 1 or 2, wherein, when determining the track of the plurality of tracks upon which the rail vehicle is located, the at least one processor is programmed or configured to: determine that the first track of the plurality of tracks upon which the rail vehicle is predicted to be located matches the second track of the plurality of tracks upon which the rail vehicle is predicted to be located.

Clause 4: The system of any of clauses 1-3, wherein the rail vehicle is a first rail vehicle of a rail vehicle system, wherein the first image capture device is a component of an end of train (EOT) unit of the first rail vehicle and the second image capture device is a component of a head of train (HOT) unit of a second rail vehicle of the rail vehicle system.

Clause 5: The system of any of clauses 1-4, wherein, when receiving the first image data associated with the first image captured by the first image capture device, the at least one processor is configured to: receive the first image data associated with the first image captured by the first image capture device based on a request.

Clause 6: The system of any of clauses 1-5, wherein the at least one processor is further programmed or configured to: determine a number of rails for each track of the plurality of tracks in the first image based on the first image data associated with the first image captured by the first image capture device; determining a number of rails for each track of the plurality of tracks in the second image based on the second image data associated with the second image captured by the second image capture device; and determining that the number of rails for each track of the plurality of tracks in the first image corresponds to the number of rails for each track of the plurality of tracks in the second image.

Clause 7: The system of any of clauses 1-6, wherein the at least one processor is further programmed or configured to: communicate data associated with the track of the plurality of tracks upon which the rail vehicle is located based on determining the track of the plurality of tracks upon which the rail vehicle is located.

Clause 8: A method for determining a presence of a rail vehicle on a track of a plurality of tracks, comprising: receiving, with at least one processor, first image data associated with a first image captured by a first image sensor, the first image sensor located at a first position on a rail vehicle; receiving, with at least one processor, second image data associated with a second image captured by a second image sensor, the second image sensor located at a second position, the second position being different than the first position; determining, with at least one processor, a first track of a plurality of tracks upon which the rail vehicle is predicted to be traveling based on the first image data associated with the first image captured by the first image sensor; determining, with at least one processor, a second track of the plurality of tracks upon which the rail vehicle is predicted to be traveling based on the second image data associated with the second image captured by the second image sensor; and determining, with at least one processor, a track of the plurality of tracks upon which the rail vehicle is traveling based on determining the first track of the plurality of tracks upon which the rail vehicle is traveling and determining the second track of the plurality of tracks upon which the rail vehicle is traveling.

Clause 9: The method of clause 8, further comprising: determining that the first track of a plurality of tracks upon which the rail vehicle is predicted to be traveling matches the second track of the plurality of tracks upon which the rail vehicle is predicted to be traveling.

Clause 10: The method of clauses 8 or 9, further comprising: communicating the first image data associated with the first image captured by a first image sensor by an end of train (EOT) unit, and wherein receiving the first image data associated with the first image captured by the first image sensor comprises: receiving the first image data associated with the first image captured by the first image sensor from the EOT unit.

Clause 11: The method of any of clauses 8-10, wherein the rail vehicle is a first rail vehicle of a rail vehicle system, wherein the first image capture device is a component of the EOT unit of the first rail vehicle and the second image capture device is a component of a head of train (HOT) unit of a second rail vehicle of the rail vehicle system.

Clause 12: The method of any of clauses 8-11, wherein the first image sensor is located at the first position on an EOT unit of the rail vehicle and the second image sensor is located at the second position on the HOT unit of the rail vehicle.

Clause 13: The method of any of clauses 8-12, further comprising: determining a number of rails in the first image based on the first image data associated with the first image captured by the first image sensor; determining a number of rails in the second image based on the second image data associated with the second image captured by the second image sensor; and determining that the number of rails in the first image corresponds to the number of rails in the second image.

Clause 14: The method of any of clauses 8-13, further comprising: communicating data associated with the track of the plurality of tracks upon which the rail vehicle is located based on determining the track of the plurality of tracks upon which the rail vehicle is located.

Clause 15: A computer program product for determining a presence of a rail vehicle on a track of a plurality of tracks, the computer program product comprising at least one non-transitory computer-readable medium including one or more instructions that, when executed by at least one processor, cause the at least one processor to: receive first image data associated with a first image captured by a first image capture device; receive second image data associated with a second image captured by a second image capture device; determine a first track of a plurality of tracks upon which a rail vehicle is predicted to be located based on the first image data associated with the first image captured by the first image capture device; determine a second track of the plurality of tracks upon which the rail vehicle is predicted to be located based on the second image data associated with the second image captured by the second image capture device; and determine a track of the plurality of tracks upon which the rail vehicle is located based on the first track of the plurality of tracks upon which the rail vehicle is predicted to be located and the second track of the plurality of tracks upon which the rail vehicle is predicted to be located.

Clause 16: The computer program product of clause 15, wherein the one or more instructions further cause the at least one processor to: determine that the first track of the plurality of tracks upon which rail vehicle is predicted to be located matches the second track of the plurality of tracks upon which the rail vehicle is predicted to be located.

Clause 17: The computer program product of clauses 15 or 16, wherein the rail vehicle is a first rail vehicle of a rail vehicle system, and wherein the one or more instructions that cause the at least one processor to receive the first image data associated with the first image captured by the first image capture device, cause the at least one processor to: receive the first image data associated with the first image captured by the first image capture device from an end of train (EOT) unit of a second rail vehicle of the rail vehicle system.

Clause 18: The computer program product of any of clauses 15-17, wherein the one or more instructions further cause the at least one processor to: determine a number of rails in the first image based on the first image data associated with the first image captured by the first image capture device; determine a number of rails in the second image based on the second image data associated with the second image captured by the second image capture device; and determine that the number of rails in the first image corresponds to the number of rails in the second image.

Clause 19: The computer program product of any of clauses 15-18, wherein the one or more instructions further cause the at least one processor to: communicate data associated with the track of the plurality of tracks upon which the rail vehicle is located based on determining the track of the plurality of tracks upon which the rail vehicle is located.

Clause 20: The computer program product of any of clauses 15-19, wherein the one or more instructions that cause the at least one processor to communicate data associated with the track of the plurality of tracks upon which the rail vehicle is located, cause the at least one processor to: communicate data associated with the track of the plurality of tracks upon which the rail vehicle is travelling.

DETAILED DESCRIPTION

Figure 1:
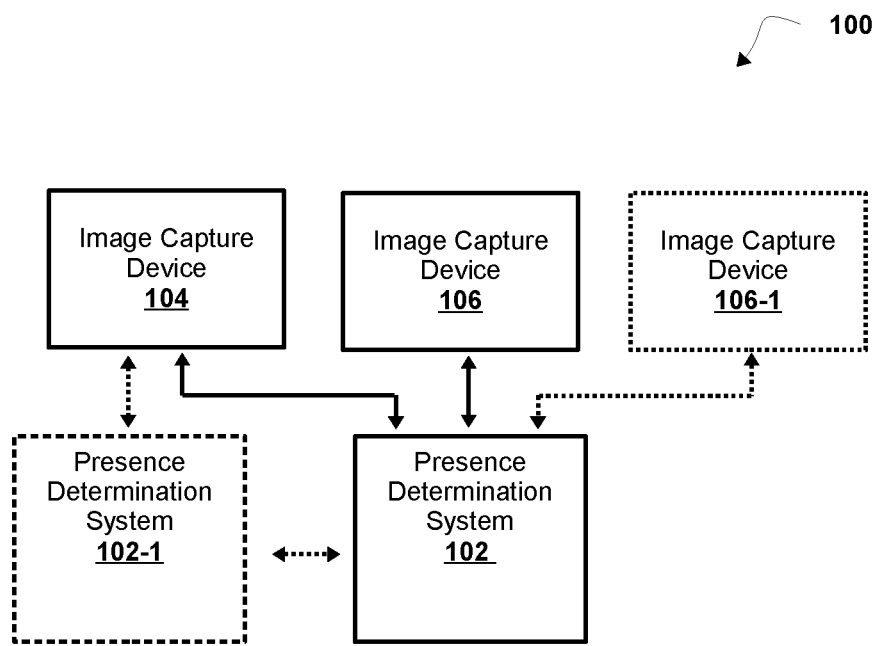
FIG. 1 is a diagram of a non-limiting embodiment of an environment in which systems, devices, products, apparatus, and/or methods, described herein, may be implemented.

The following detailed description of non-limiting embodiments refers to the accompanying drawings. The same reference numbers in different drawings may identify the same or similar elements.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, etc.). For one unit (e.g., a device, a system, a component of a device or system, combinations thereof, etc.) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As disclosed herein, in some non-limiting embodiments, a presence determination system receives first image data associated with a first image captured by a first image capture device, receive second image data associated with a second image captured by a second image capture device, determines a first track of a plurality of tracks upon which a rail vehicle is predicted to be located based on the first image data associated with the first image captured by the first image capture device, determines a second track of the plurality of tracks upon which the rail vehicle is predicted to be located based on the second image data associated with the second image captured by the second image capture device, and determines a track of the plurality of tracks upon which the rail vehicle is located based on the first track of the plurality of tracks upon which the rail vehicle is predicted to be located and the second track of the plurality of tracks upon which the rail vehicle is predicted to be located.

In this way, the presence determination system may more confidently and more accurately determine a track of the plurality of tracks upon which the rail vehicle is located as compared to a situation where a determination is made based on single image of a plurality of tracks. For example, the presence determination system may more confidently and more accurately determine a track of the plurality of tracks upon which the rail vehicle is located since the presence determination system uses redundancy based on first image data associated with a first image captured by a first image capture device and second image data associated with a second image captured by a second image capture device.

Referring now to FIG. 1, FIG. 1 is a diagram of a non-limiting embodiment of an environment 100 in which systems, devices, products, apparatus, and/or methods, described herein, may be implemented. As shown in FIG. 1, environment 100 includes presence determination system 102, image capture device 104, and image capture device 106. Systems and/or devices of environment 100 may interconnect via wired connections, wireless connections, or a combination of wired and wireless connections. For example, systems and/or devices of environment 100 may interconnect via one or more wired and/or wireless networks, where the one or more wired and/or wireless networks may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

As further shown in FIG. 1, in some non-limiting embodiments, environment 100 may include one or more additional presence determination systems, such as presence determination system 102-1 through presence determination system 102-N (not shown). For example, environment 100 may include presence determination system 102-1 that may be interconnected with image capture device 104 and/or presence determination system 102-1. As further shown in FIG. 1, in some non-limiting embodiments, environment 100 may include one or more additional image capture devices, such as image capture device 106-1 through presence determination system 106-N (not shown).

In some non-limiting embodiments, presence determination system 102 includes one or more devices capable of receiving image data associated with an image (e.g., image data associated with an image of one or more tracks, etc.), storing the image data, processing the image data, and/or providing the image data to another device. For example, presence determination system 102 may include one or more computing devices comprising one or more processors (e.g., one or more servers, one or more client devices, etc.). In some non-limiting embodiments, presence determination system 102 may be a component of a positive train control (PTC) system.

In some non-limiting embodiments, presence determination system 102 is capable of processing the image data to generate a prediction (e.g., a prediction score, etc.) of a location of a rail vehicle on a track. For example, presence determination system 102 may be capable of processing the image data to generate a prediction (e.g., a prediction score, etc.) of whether a rail vehicle is located on a track of a plurality of tracks (e.g., a set of parallel tracks). In some non-limiting embodiments, an additional presence determination system (e.g., presence determination system 102-1) may be the same or similar to presence determination system 102.

In some non-limiting embodiments, image capture device 104 includes one or more devices capable of detecting an image (e.g., image data associated with an image of one or more tracks, image data associated with an image of a set of parallel tracks, etc.), capturing image data associated with the image, and/or communicating the image data that is captured (e.g., communicating the image data to presence determination system 102). For example, image capture device 104 may include an image sensor, a device that includes an image sensor, a camera (e.g., a digital camera, an infrared camera, etc.), a video recorder, a video camera, and/or the like.

In some non-limiting embodiments, image capture device 106 includes one or more devices capable of detecting an image (e.g., image data associated with an image of one or more tracks, image data associated with an image of a set of parallel tracks, etc.), capturing image data associated with the image, and/or communicating the image data that is captured (e.g., communicating the image data to presence determination system 102). For example, image capture device 106 may include an image sensor, a device that includes an image sensor, a camera (e.g., a digital camera, an infrared camera, etc.), a video recorder, a video camera, and/or the like. In some non-limiting embodiments, image capture device 106 may capture an image using a different image capture technology than image capture device 104. For example, image capture device 106 may include an infrared camera that provides an image based on infrared radiation and image capture device 104 may include a common camera that provides an image based on visible light.

In some non-limiting embodiments, image capture device 104 may be located at a first location and image capture device 106 may be located at a second location that is different than the first location. For example, image capture device 104 may be mounted on a rail vehicle (e.g., a rail vehicle at the front of a rail vehicle system, a locomotive of a train, etc.) and image capture device 106 may be mounted on a different rail vehicle (e.g., a rail vehicle at the back of a rail vehicle system, a caboose of a train, etc.). In some non-limiting embodiments, image capture device 104 may be mounted on a rail vehicle and image capture device 106 may be mounted on the same rail vehicle. For example, image capture device 104 and image capture device 106 may be mounted on the front of the same rail vehicle and may each capture an image that is substantially the same. In some non-limiting embodiments, image capture device 104 may be mounted on a rail vehicle and image capture device 106 may be mounted on the same rail vehicle but at different locations of the same rail vehicle. For example, image capture device 104 may capture an image from the front of the rail vehicle and image capture device 106 may capture an image from the rear of the rail vehicle.

In some non-limiting embodiments, presence determination system 102, image capture device 104, and/or image capture device 106 may be associated with an image database which includes one or more devices capable of receiving, storing, and/or communicating image data associated with an image. The image database may include one or more data structures for storing the image data. In some non-limiting embodiments, presence determination system 102 may include the image database.

The number and arrangement of systems shown in FIG. 1 are provided as an example. There may be additional systems, devices and/or networks, fewer systems, devices, and/or networks, different systems, devices and/or networks, or differently arranged systems, devices, and/or networks than those shown in FIG. 1. Furthermore, two or more systems or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 perform one or more functions described as being performed by another set of systems or another set of devices of environment 100.

Figure 2:
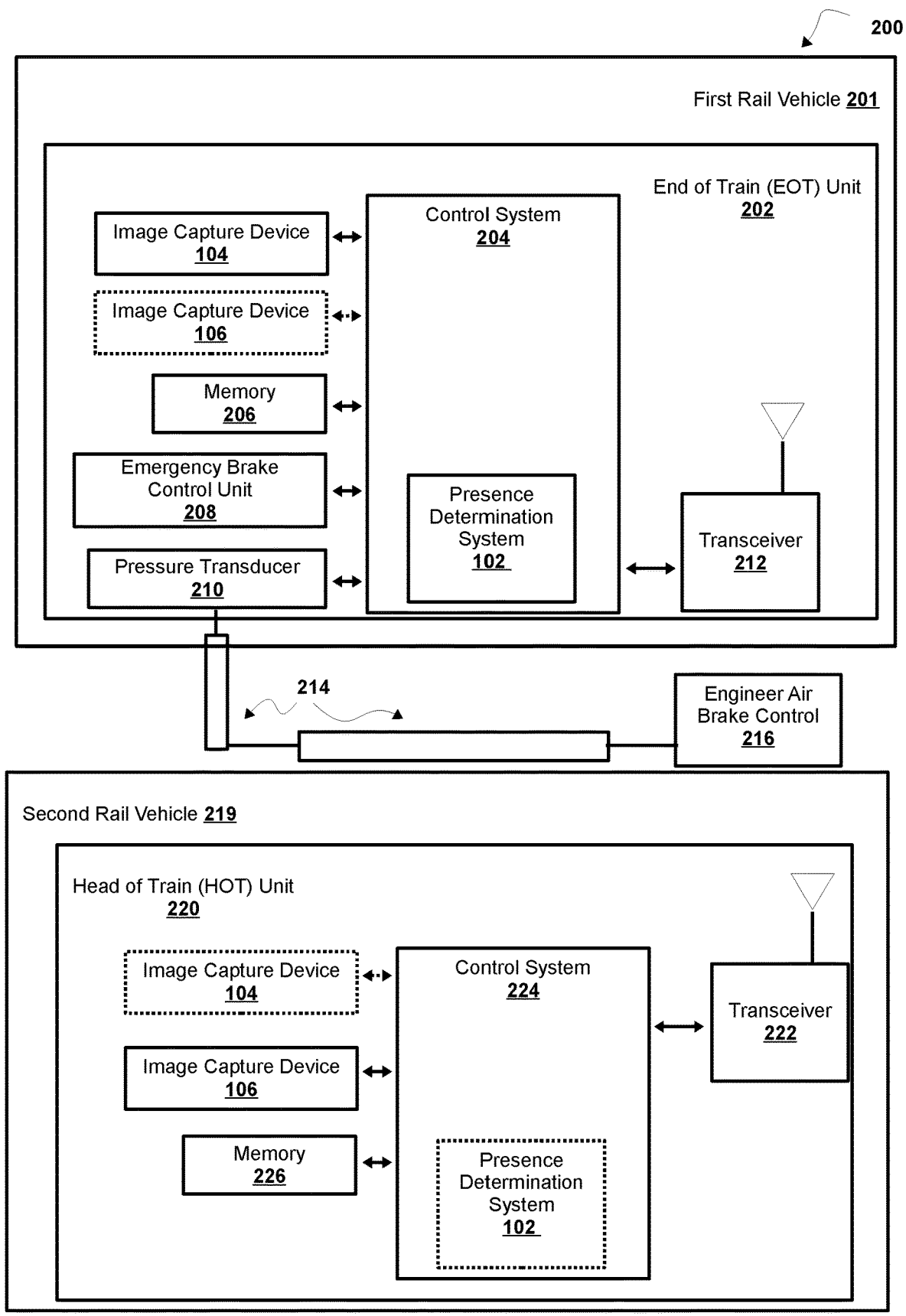
FIG. 2 is a diagram of a non-limiting embodiment of a rail vehicle system.

Referring now to FIG. 2, FIG. 2 is a diagram of a non-limiting embodiment of a rail vehicle system 200 for determining a presence of a rail vehicle on a track of a plurality of tracks. As shown in FIG. 2, a first rail vehicle 201 may include end of train (EOT) unit 202 which includes image capture device 104, control system 204, memory 206, emergency brake control unit 208, pressure transducer 210, and transceiver 212. As further shown in FIG. 2, control system 204 includes presence determination system 102. In some non-limiting embodiments, EOT unit 202 may include image capture device 106. For example, EOT unit 202 may include image capture device 104 and image capture device 106 (e.g., head of train (HOT) unit 220 does not include image capture device 104 or image capture device 106). In some non-limiting embodiments, presence determination system 102 may be remote from EOT unit 202. For example, presence determination system 102 may include a server (e.g., that is not part of EOT unit 202) that communicates with EOT unit 202 via a network (e.g., a wireless network).

As further shown in FIG. 2, a second rail vehicle 219 may include HOT unit 220 which includes image capture device 106, transceiver 222, control system 224, and memory 226. In some non-limiting embodiments, HOT unit 220 may include image capture device 104. For example, HOT unit 220 may include image capture device 104 and image capture device 106 (e.g., EOT unit 202 does not include image capture device 104 or image capture device 106). In some non-limiting embodiments, control system 224 may include presence determination system 102. Additionally or alternatively, presence determination system 102 may be remote from HOT 220. For example, presence determination system 102 may include a server (e.g., that is not part of HOT unit 220) that communicates with HOT unit 220 via a network (e.g., a wireless network).

In some non-limiting embodiments, EOT unit 202 may be mounted on a trailing coupler of the last rail vehicle in a rail vehicle system (e.g., a plurality of rail vehicles connected together, a train, a train of cars, etc.) and EOT unit 202 may be equipped with a device for monitoring the pressure of a brake system of the rail vehicle system and/or a telemetry device. For example, EOT unit 202 may include pressure transducer 210 that is connected to air brake coupling 214 and control system 204.

In some non-limiting embodiments, control system 204 and/or control system 224 may receive telemetry information (e.g., position information, GPS position information, etc.) associated with a rail vehicle (e.g., a rail vehicle that includes EOT unit 202, a rail vehicle that does not include EOT unit 202, a rail vehicle that includes HOT unit 220, a rail vehicle that does not include HOT unit 220, a rail vehicle of a rail vehicle system, etc.). In some non-limiting embodiments, control system 204 and/or control system 224 may affect the operation of the rail vehicle based on the telemetry information. For example, control system 204 and/or control system 224 may cause a brake system of the rail vehicle to be activated based on the telemetry information.

In some non-limiting embodiments, air brake coupling 214 may mechanically couple a rail vehicle that includes HOT unit 220 to EOT unit 202. In some non-limiting embodiments, air brake coupling 214 may be used by HOT unit 220 and/or EOT unit 202 to verify (e.g., based on a physical connection) that HOT unit 220 and/or EOT unit 202 is properly linked for communication between HOT unit 220 and EOT unit 202. In some non-limiting embodiments, an engineer (e.g., a locomotive engineer) may control the air brakes of a rail vehicle (e.g., a rail vehicle of a rail vehicle system) via engineer air brake controls 216 and air brake coupling 214, which may extend the length of a rail vehicle system. In some non-limiting embodiments, control system 204 may control the air brakes of a rail vehicle in an emergency situation via emergency brake control unit 208.

In some non-limiting embodiments, EOT unit 202 may communicate with (e.g., send information to and receive information from) HOT unit 220 and vice versa via a communication link (e.g., a short range communication link) between transceiver 212 and transceiver 222. For example, EOT unit 202 may communicate position information relating to a position of a rail vehicle (e.g., position information relating to a position of a rail vehicle derived from a GPS receiver of the rail vehicle) to HOT unit 220 via the communication link between transceiver 212 and transceiver 222. In some non-limiting embodiments, the communication link may operate with a bandwidth of 450 Mhz. The way in which EOT unit 202 may communicate with HOT unit 220 and vice versa, as well as control systems described above, are described in more detail in U.S. patent application Ser. No. 07/313,877, filed Feb. 23, 1989, which is assigned to the same assignee as this application and is incorporated herein by reference.

In some non-limiting embodiments, control system 204 and/or control system 224 may receive image data associated with an image captured by image capture device 104 and/or image capture device 106. Control system 204 and/or control system 224 may provide the image data to presence determination system 102. Presence determination system 102 may determine a presence of a rail vehicle (e.g., a rail vehicle of a rail vehicle system) on a plurality of tracks and presence determination system 102 may provide information associated with the position of the rail vehicle (e.g., information associated with the presence of the rail vehicle on a track) to control system 204 and/or control system 224. Control system 204 and/or control system 224 may take an action based on the position of the rail vehicle. For example, control system 204 and/or control system 224 may cause a brake system to be activated based on the position of the rail vehicle.

In some non-limiting embodiments, control system 204 and/or control system 224 may store image data associated with an image captured by image capture device 104 and/or image capture device 106. For example, control system 204 may store image data associated with an image captured by image capture device 104 and/or image capture device 106 in memory 206. In another example, control system 224 may store image data associated with an image captured by image capture device 104 and/or image capture device 106 in memory 226.

In some non-limiting embodiments, presence determination system 102 may be remote from EOT unit 202 and HOT unit 220. For example, presence determination system 102 may include a server that is remote (e.g., a back office server) from EOT unit 202 and HOT unit 220. In such an example, EOT unit 202 and/or HOT unit 220 may communicate image data associated with an image captured by image capture device 104 and/or image capture device 106 to presence determination system 102 via a network (e.g., a wireless network). Presence determination system 102 may communicate data associated with a track of a plurality of tracks upon which a rail vehicle is located to EOT unit 202 and/or HOT unit 220 after receiving the image data. In some non-limiting embodiments, EOT unit 202, control system 204, HOT unit 220, and/or control system 224 may include one or more computing devices comprising one or more processors (e.g., one or more servers, one or more client devices, etc.).

Figure 3:
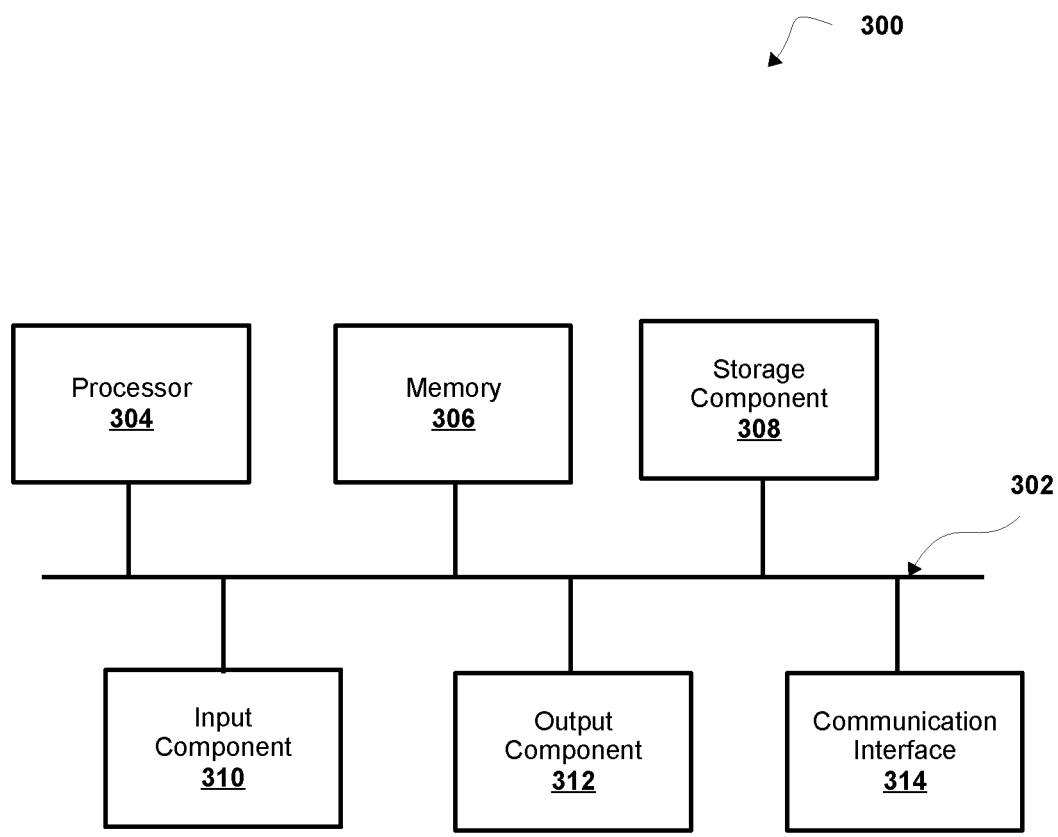
FIG. 3 is a diagram of a non-limiting embodiment of components of one or more devices of FIG. 1 and FIG. 2.

Referring now to FIG. 3, FIG. 3 is a diagram of example components of a device 300. Device 300 corresponds to one or more devices of presence determination system 102, one or more devices of EOT unit 202 (e.g., control system 204), and/or one or more devices of HOT unit 220 (e.g., control system 224). In some non-limiting embodiments, one or more devices of presence determination system 102, one or more devices of EOT unit 202 (e.g., control system 204), and/or one or more devices of HOT unit 220 (e.g., control system 224) may include at least one device 300 and/or at least one component of device 300. As shown in FIG. 3, device 300 may include bus 302, processor 304, memory 306, storage component 308, input component 310, output component 312, and communication interface 314.

Bus 302 may include a component that permits communication among the components of device 300. In some non-limiting embodiments, processor 304 may be implemented in hardware, firmware, or a combination of hardware and software. For example, processor 304 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 may include a random access memory (RAM), a read only memory (ROM), and/or another type of dynamic or static storage device (e.g., flash memory, magnetic memory, optical memory, etc.) that stores information and/or instructions for use by processor 304.

Storage component 308 may store information and/or software related to the operation and use of device 300. For example, storage component 308 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 310 may include a component that permits device 300 to receive information, such as via user input (e.g., a touch screen display, a keyboard, a keypad, a mouse, a button, a switch, a microphone, etc.). Additionally or alternatively, input component 310 may include a sensor for sensing information (e.g., a GPS component, an accelerometer, a gyroscope, an actuator, etc.). Output component 312 may include a component that provides output information from device 300 (e.g., a display, a speaker, one or more light-emitting diodes (LEDs), etc.).

Communication interface 314 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 314 permits device 300 to receive information from another device and/or provide information to another device. For example, communication interface 314 may include an Ethernet interface, an optical interface, a coaxial interface, an infrared interface, a radio frequency (RF) interface, a universal serial bus (USB) interface, a Wi-Fi interface, a cellular network interface, and/or the like.

In some non-limiting embodiments, device 300 performs one or more processes described herein. In some non-limiting embodiments, device 300 performs these processes based on processor 304 executing software instructions stored by a computer-readable medium, such as memory 306 and/or storage component 308. A computer-readable medium (e.g., a non-transitory computer-readable medium) is defined herein as a non-transitory memory device. A memory device includes memory space located inside of a single physical storage device or memory space spread across multiple physical storage devices.

Software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 3 are provided as an example. In some non-limiting embodiments, device 300 includes additional components, fewer components, different components, or differently arranged components than those shown in FIG. 3. Additionally or alternatively, a set of components (e.g., one or more components) of device 300 performs one or more functions described as being performed by another set of components of device 300.

Figure 4:
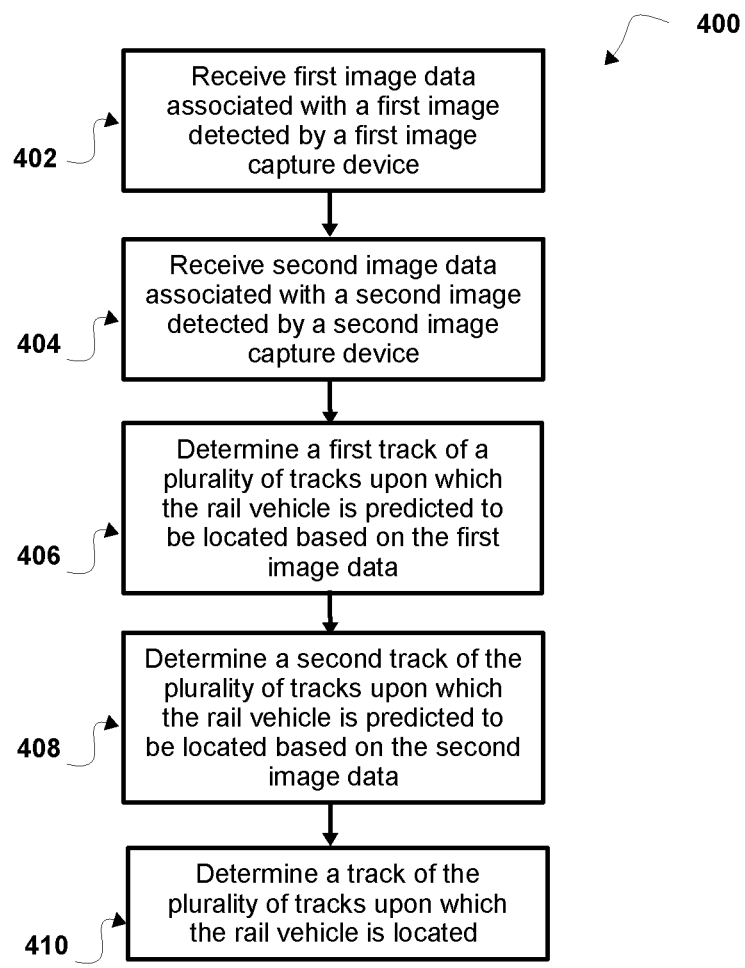
FIG. 4 is a flowchart of a non-limiting embodiment of a process for determining a presence of a rail vehicle on a track of a plurality of tracks.

Referring now to FIG. 4, FIG. 4 is a flowchart of a non-limiting embodiment of a process 400 for determining a presence of a rail vehicle on a track of a plurality of tracks. In some non-limiting embodiments, one or more of the steps of process 400 may be performed (e.g., completely, partially, etc.) by presence determination system 102 (e.g., one or more devices of presence determination system 102). In some non-limiting embodiments, one or more of the steps of process 400 may be performed (e.g., completely, partially, etc.) by another device or a group of devices separate from or including presence determination system 102, such as an additional presence determination system (e.g., presence determination system 102-1), one or more components of control system 204, and/or the like.

As shown in FIG. 4, at step 402, process 400 includes receiving first image data associated with a first image detected by a first image capture device (e.g., image capture device 104). For example, presence determination system 102 may receive the first image data associated with the first image captured by image capture device 104. In some non-limiting embodiments, the first image data may be associated with an image of a plurality of tracks (e.g., an image that includes a track of a plurality of tracks). For example, the first image data may be associated with an image of a set of parallel tracks that includes a track upon which a rail vehicle is located (e.g., upon which a rail vehicle is travelling in real-time, upon which a rail vehicle has travelled, etc.).

As further shown in FIG. 4, at step 404, process 400 includes receiving second image data associated with a second image detected by a second image capture device (e.g., image capture device 106). For example, presence determination system 102 may receive the second image data associated with the second image captured by image capture device 106. In some non-limiting embodiments, the second image data may be associated with an image of a plurality of tracks (e.g., an image that includes a track of a plurality of tracks). For example, the image data may be associated with an image of a set of parallel tracks that includes a track upon which a rail vehicle is located (e.g., upon which a rail vehicle is travelling in real-time, upon which a rail vehicle has travelled, etc.).

In some non-limiting embodiments, the first image data is associated with a first image that is the same as a second image of which the second image data is associated. For example, image capture device 104 may be located on a front rail vehicle (e.g., a rail vehicle including an HOT unit) of a rail vehicle system and image capture device 106 may also be located on the front rail vehicle of the rail vehicle system. Image capture device 104 may capture an image of the plurality of tracks upon which the rail vehicle system is traveling as viewed from the front of the rail vehicle system and image capture device 106 may capture an image of the plurality of tracks upon which the rail vehicle system is traveling as viewed from the front of the rail vehicle system. The first image data associated with the first image may include image data associated with an image from a perspective of the front of the rail vehicle system and the second image data associated with the second image may also include image data associated with an image from the perspective of the front of the rail vehicle system. In some non-limiting embodiments, the first image capture device may be located on the front of a rail vehicle and the second image capture device may be located on the rear of the rail vehicle.

In some non-limiting embodiments, the first image data is associated with a first image that is different from a second image of which the second image data is associated. For example, image capture device 104 may be located on a rear rail vehicle (e.g., a rail vehicle including an EOT unit) of a rail vehicle system and image capture device 106 may be located on a front rail vehicle (e.g., a rail vehicle including an HOT unit) of the rail vehicle system. Image capture device 104 may detect an image of the plurality of tracks upon which the rail vehicle system is traveling as viewed from the rear of the rail vehicle system and image capture device 106 may capture an image of the plurality of tracks upon which the rail vehicle system is traveling as viewed from the front of the rail vehicle system. The first image data associated with the first image may include image data associated with an image from a perspective of the front of the rail vehicle system and the second image data associated with the second image may include image data associated with an image from a perspective of the rear of the rail vehicle system.

In some non-limiting embodiments, presence determination system 102 may receive the first image data associated with the first image captured by image capture device 104 and/or the second image data associated with the second image captured by image capture device 106 based on a request (e.g., a request command). For example, during a process associated with establishing an initial location of a rail vehicle, presence determination system 102 may communicate a request to image capture device 104 and/or image capture device 106. Image capture device 104 and/or image capture device 106 may communicate the image data associated with the image captured by image capture device 104 and/or image capture device 106 based on receiving the request. Presence determination system 102 may receive the first image data associated with the first image captured by image capture device 104 and/or the second image data associated with the second image captured by image capture device 106 based on image capture device 104 and/or image capture device 106 communicating the image data.

As further shown in FIG. 4, at step 406, process 400 includes determining a first track of a plurality of tracks upon which the rail vehicle is predicted to be located based on the first image data. For example, presence determination system 102 may determine a first track (e.g., a position of a first track, an identification of a first track, etc.) of a plurality of tracks upon which the rail vehicle is predicted to be located based on the first image data.

In some non-limiting embodiments, presence determination system 102 may determine a first track of the plurality of tracks upon which the rail vehicle is predicted to be located based on a machine vision algorithm. For example, presence determination system 102 may create a diagram that includes lines representing the rails of each track (e.g., two lines representing two rails of each track) of the plurality of tracks within an image based on the first image data associated with the first image. Presence determination system 102 may determine a slope of each line representing a rail in the diagram. Presence determination system 102 may determine the track of the plurality of tracks upon which a rail vehicle is located based on identifying two adjacent lines in the diagram that have opposite slopes. For example, presence determination system 102 may determine the track of a plurality of tracks upon which the rail vehicle is located based on identifying a first line in the diagram that has a positive slope and a second line, which is adjacent to the first line, in the diagram that has a negative slope. In such an example, the first line corresponds to a first rail of a track upon which the rail vehicle is predicted to be located and the second line corresponds to a second rail of the track.

As further shown in FIG. 4, at step 408, process 400 includes determining a second track of the plurality of tracks upon which the rail vehicle is predicted to be located based on the second image data. For example, presence determination system 102 may determine a second track (e.g., a position of a second track, an identification of a second track, etc.) of a plurality of tracks upon which the rail vehicle is predicted to be located based on the second image data.

In some non-limiting embodiments, presence determination system 102 may determine a second track of the plurality of tracks upon which the rail vehicle is predicted to be located based on a machine vision algorithm. For example, presence determination system 102 may create a diagram that includes lines representing the rails of each track (e.g., two lines representing two rails of each track) of the plurality of tracks within an image based on the first image data associated with the first image. Presence determination system 102 may determine a slope of each line representing a rail in the diagram. Presence determination system 102 may determine the track of the plurality of tracks upon which a rail vehicle is located based on identifying two adjacent lines in the diagram that have opposite slopes. For example, presence determination system 102 may determine the track of a plurality of tracks upon which the rail vehicle is located based on identifying a first line in the diagram that has a positive slope and a second line, which is adjacent to the first line, in the diagram that has a negative slope. In such an example, the first line corresponds to a first rail of a track upon which the rail vehicle is predicted to be located and the second line corresponds to a second rail of the track.

In some non-limiting embodiments, presence determination system 102 may determine the second track of a plurality of tracks upon which the rail vehicle is predicted to be located using an image processing routine that is different than the image processing routine that presence determination system 102 uses to determine the first track of a plurality of tracks upon which the rail vehicle is predicted to be located. For example, presence determination system 102 may determine the second track upon which the rail vehicle is predicted to be located using a Laplacian edge detection algorithm and presence determination system 102 may determine the first track using a Hough transform line detection algorithm.

As further shown in FIG. 4, at step 410, process 400 includes determining a track of the plurality of tracks upon which the rail vehicle is located. For example, presence determination system 102 may determine the track (e.g., a position of the track, an identification of the track, etc.) of the plurality of tracks upon which the rail vehicle is located. In some non-limiting embodiments, presence determination system 102 may determine the track of the plurality of tracks upon which the rail vehicle is located based on the first track of the plurality of tracks upon which the rail vehicle is predicted to be located and the second track of the plurality of tracks upon which the rail vehicle is predicted to be located. For example, presence determination system 102 may determine whether the first track of the plurality of tracks upon which the rail vehicle is predicted to be located matches the second track of the plurality of tracks upon which the rail vehicle is predicted to be located. If presence determination system 102 determines that the first track of the plurality of tracks upon which the rail vehicle is predicted to be located matches the second track of the plurality of tracks upon which the rail vehicle is predicted to be located, then presence determination system 102 may determine that the track of the plurality of tracks upon which the rail vehicle is located is the first track or the second track. If presence determination system 102 determines that the first track of the plurality of tracks upon which the rail vehicle is predicted to be located does not match the second track of the plurality of tracks upon which the rail vehicle is predicted to be located, then presence determination system 102 may determine that the track of the plurality of tracks upon which the rail vehicle is located is not the first track or the second track.

In some non-limiting embodiments, presence determination system 102 may determine the track of the plurality of tracks upon which the rail vehicle is located based on the first image data and the second image data, where the first image data is associated with a first image that is different from a second image of which the second image data is associated. For example, presence determination system 102 may determine the first track of the plurality of tracks upon which the rail vehicle is predicted to be located based on image data associated with an image from a perspective of a front rail vehicle (e.g., a rail vehicle including an HOT unit) of a rail vehicle system. Presence determination system 102 may determine the second track of the plurality of tracks upon which the rail vehicle is predicted to be located based on image data associated with an image from a perspective of a rear rail vehicle (e.g., a rail vehicle including an EOT unit) of a rail vehicle system. After determining the first track of the plurality of tracks and the second track of the plurality of tracks, presence determination system 102 may determine the track of the plurality of tracks upon which the rail vehicle is located based on determining that the first track of the plurality of tracks matches the second track of the plurality of tracks. In this way, presence determination system 102 may determine the track of the plurality of tracks upon which the rail vehicle is located with more accuracy than where the image data used to determine the first track is the same as the image data used to determine the second track. Image capture device 104 may capture an image of the plurality of tracks upon which the rail vehicle system is traveling as viewed from the rear of the rail vehicle system and image capture device 106 may capture an image of the plurality of tracks upon which the rail vehicle system is traveling as viewed from the front of the rail vehicle system. The first image data associated with the first image may include image data associated with an image from a perspective of the front of the rail vehicle system and the second image data associated with the second image may include image data associated with an image from a perspective of the rear of the rail vehicle system.

In some non-limiting embodiments, presence determination system 102 may communicate information associated with the track of the plurality of tracks upon which the rail vehicle is located based on determining the track of the plurality of tracks upon which the rail vehicle is located. For example, presence determination system 102 may communicate track occupancy information associated with the track (e.g., an indication that the track is occupied by the rail vehicle) of the plurality of tracks upon which the rail vehicle is located based on determining the track of the plurality of tracks upon which the rail vehicle is located.

In some non-limiting embodiments, if presence determination system 102 determines that the first track of the plurality of tracks upon which the rail vehicle is predicted to be located does not match the second track of the plurality of tracks upon which the rail vehicle is predicted to be located, then presence determination system 102 may cause image capture device 104 and/or image capture device 106 to capture a new image of the plurality of tracks upon which the rail vehicle is located, may cause image capture device 104 and/or image capture device 106 to communicate image data associated with the new image of the plurality of tracks to presence determination system 102, and presence determination system 102 may determine the track of the plurality of tracks upon which the rail vehicle is located based on the image data associated with the new image of the plurality of tracks as described above.

In some non-limiting embodiments, if presence determination system 102 determines that the first track of the plurality of tracks upon which the rail vehicle is predicted to be located matches the second track of the plurality of tracks upon which the rail vehicle is predicted to be located, presence determination system 102 may cause a rail vehicle to take an action associated with operation of the rail vehicle. For example, presence determination system 102 may cause a brake system of the rail vehicle to be activated based on determining that the first track of the plurality of tracks upon which the rail vehicle is predicted to be located matches the second track of the plurality of tracks upon which the rail vehicle is predicted to be located. In some non-limiting embodiments, presence determination system 102 may cause a PTC system located on the rail vehicle to establish a known location of the rail vehicle and subsequently activate the brake system of the rail vehicle if it is determined by the PTC system that a hazardous condition is present (e.g., detected to be present, anticipated to be present, etc.) based upon the known location established by the PTC system. For example, presence determination system 102 may activate the brake system of the rail vehicle if it is determined by the PTC system that a hazardous condition is present based upon the known location established by the PTC system and based on determining that the first track of the plurality of tracks upon which the rail vehicle is predicted to be located matches the second track of the plurality of tracks upon which the rail vehicle is predicted to be located.

In some non-limiting embodiments, presence determination system 102 may determine a number of rails for each track of the plurality of tracks in the first image based on the first image data associated with the first image, determine a number of rails for each track of the plurality of tracks in the second image, and determine that the number of rails for each track of the plurality of tracks in the first image corresponds to the number of rails for each track of the plurality of tracks in the second image. For example, prior to determining the track of the plurality of tracks upon which the rail vehicle is located, presence determination system 102 may determine that the number of rails for each track of the plurality of tracks in the first image is the same as the number of rails for each track of the plurality of tracks in the second image.

In some non-limiting embodiments, if presence determination system 102 determines that the number of rails for each track of the plurality of tracks in the first image is not the same as the number of rails for each track of the plurality of tracks in the second image, the presence determination system 102 may cause a field of view of image capture device 104 and/or image capture device 106 to be adjusted.

For example, if presence determination system 102 determines that the number of rails for each track of the plurality of tracks in the first image is not the same as the number of rails for each track of the plurality of tracks in the second image, the presence determination system 102 may cause a field of view of image capture device 104 and/or image capture device 106 to be adjusted until the number of rails for each track of the plurality of tracks in the first image is the same as the number of rails for each track of the plurality of tracks in the second image.

In some non-limiting embodiments, presence determination system 102 may determine a position of the track of the plurality of tracks upon which the rail vehicle is located based on the first image data and the second image data. For example, presence determination system 102 may determine a position of a first track of a plurality of tracks upon which the rail vehicle is predicted to be located based on the first image data according to a first confidence level (e.g., a first probability that the first track is a track having a specific position in the plurality of tracks). Presence determination system 102 may determine a position of a second track of the plurality of tracks upon which the rail vehicle is predicted to be located based on the second image data according to a second confidence level (e.g., a second probability that the second track is a track having the specific position in the plurality of tracks). In such an example, if presence determination system 102 determines that the position of the first track in the plurality of tracks and the position of the second track in the plurality of tracks is the same, then presence determination system 102 may combine (e.g., calculate a sum of, calculate an average of, etc.) the first confidence level and the second confidence level. Presence determination system 102 may compare the combination of the first confidence level and the second confidence level to a threshold (e.g., a predetermined threshold value of a confidence level, a high confidence level threshold, etc.). If the combination satisfies the threshold, presence determination system 102 may determine that the position of the track upon which the rail vehicle is located is the same as the position of the first track in the plurality of tracks and/or the position of the second track in the plurality of tracks. In some non-limiting embodiments, if the combination does not satisfy the threshold, presence determination system 102 may determine that the position of the track upon which the rail vehicle is located is not the same as the position of the first track in the plurality of tracks and/or the position of the second track in the plurality of tracks.

Referring now to FIGS. 5A-5D, FIGS. 5A-5D are diagrams of an overview of a non-limiting embodiment of an implementation 500 relating to a process for determining a presence of a rail vehicle on a plurality of tracks based on image data. As shown in FIGS. 5A-5D, implementation 500 may include first rail vehicle 501 and second rail vehicle 519. First rail vehicle 501 may include image capture device 504 and second rail vehicle 519 may include presence determination system 502 and image capture device 506. In some non-limiting embodiments, first rail vehicle 501 may be the same or similar to first rail vehicle 201 and second rail vehicle 519 be the same or similar to second rail vehicle 219. In some non-limiting embodiments, presence determination system 502 may be the same or similar to presence determination system 102, image capture device 504 may be the same or similar to image capture device 104, and image capture device 506 may be the same or similar to image capture device 106.

Figure 5A:
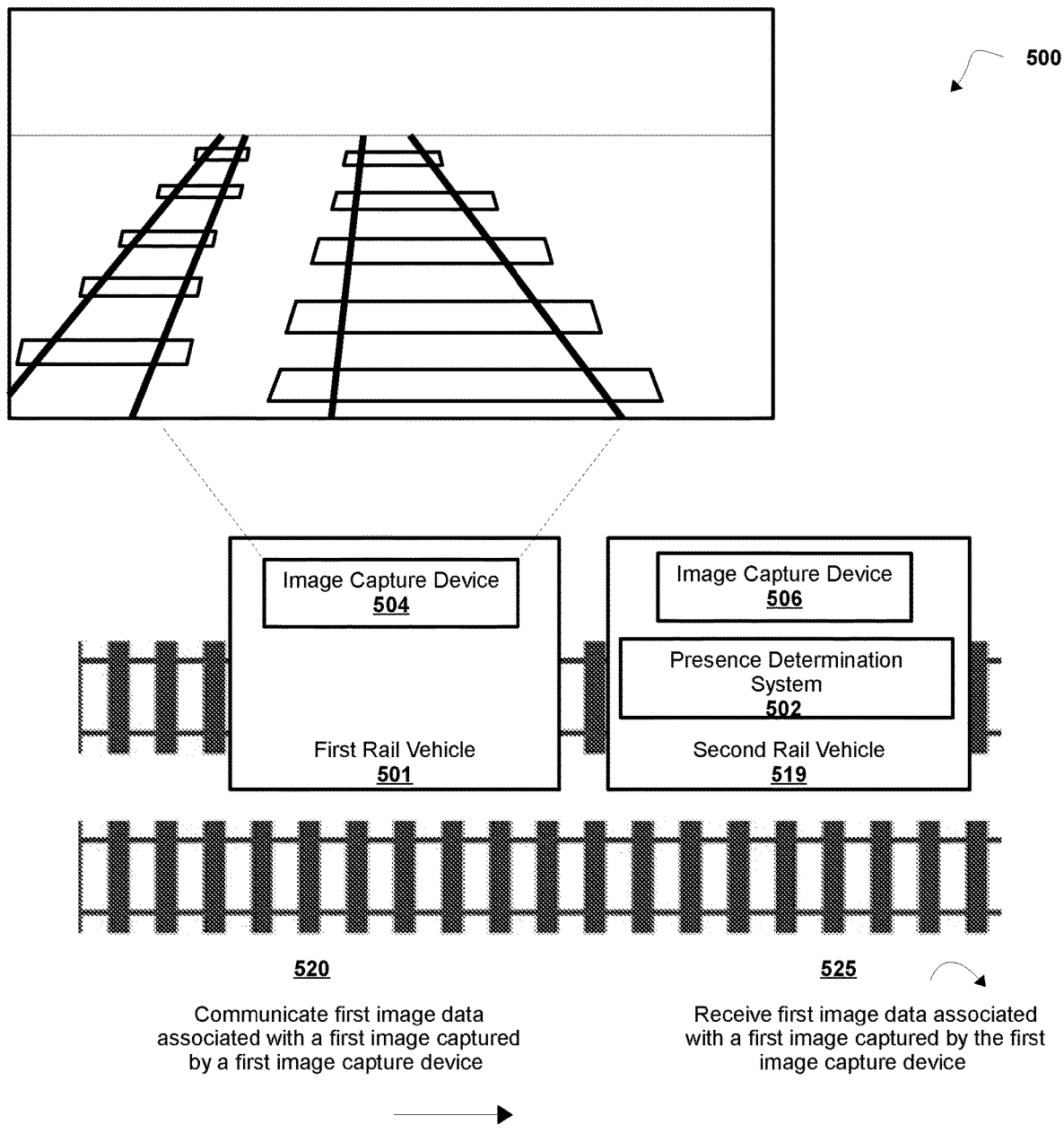
FIGS. 5A-5D are diagrams of an implementation of a non-limiting embodiment of a process disclosed herein.

As shown by reference number 520 in FIG. 5A, first rail vehicle 501 may communicate first image data associated with a first image captured by a first image capture device 504 to second rail vehicle 519. The first image may include an image of a plurality of tracks from the perspective of the rear of a rail vehicle system that includes first rail vehicle 501 and second rail vehicle 519. In some non-limiting embodiments, first rail vehicle 501 (e.g., one or more devices of first rail vehicle 501, one or more processors of first rail vehicle 501, etc.) may communicate the first image data captured by image capture device 504 via a network that is independent of a communication link (e.g., a short range communication link) between first rail vehicle 501 and second rail vehicle 519. For example, first rail vehicle 501 may communicate the first image data captured by image capture device 504 via a cellular network to second rail vehicle 519. As further shown by reference number 525 in FIG. 5A, presence determination system 502 may receive first image data associated with a first image captured by the first image capture device 504 based on first rail vehicle 501 communicating the first image data to second rail vehicle 519.

Figure 5B:
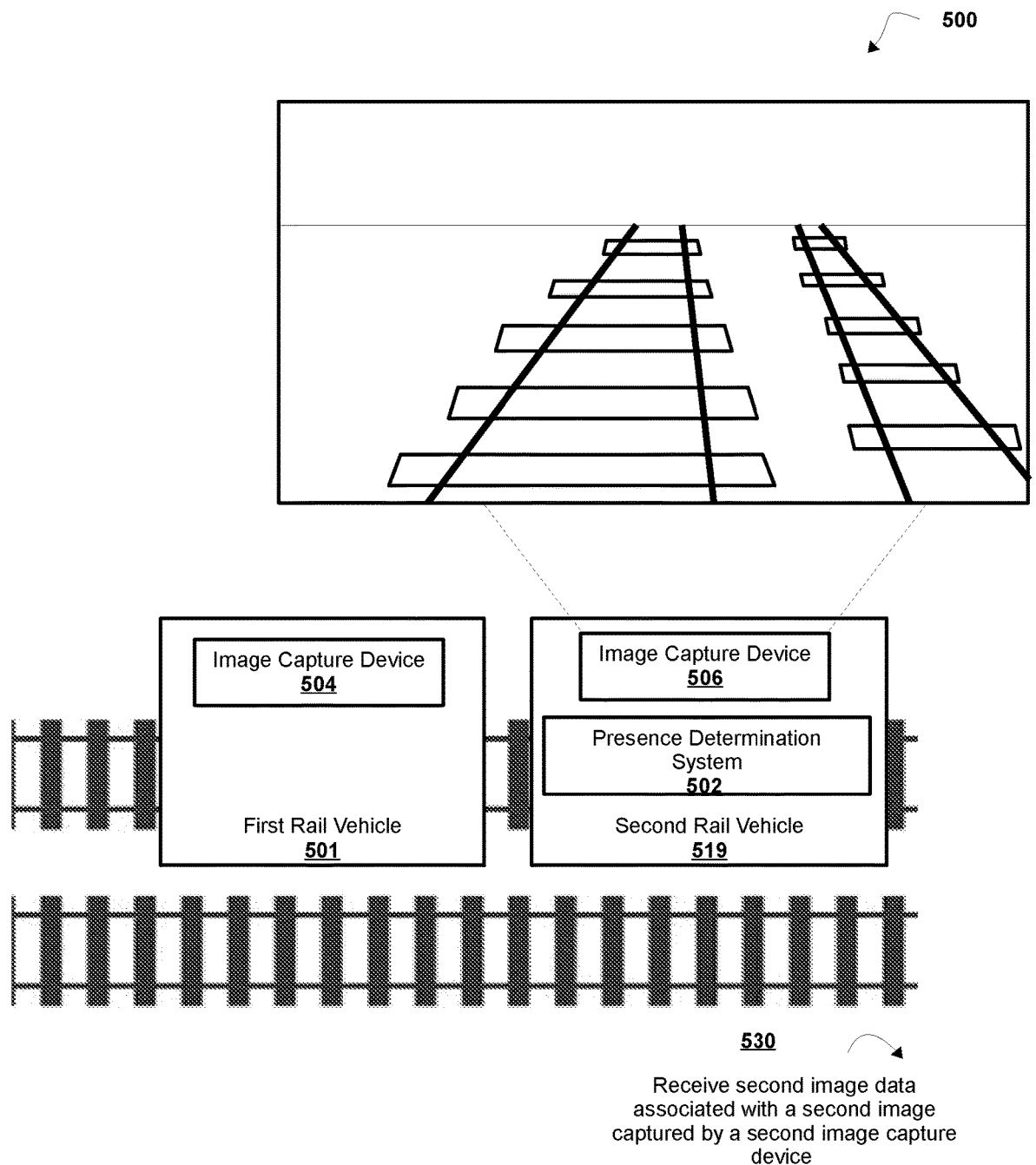

As shown by reference number 530 in FIG. 5B, presence determination system 502 may receive second image data associated with a second image captured by a second image capture device 506. The second image may include an image of the plurality of tracks from the perspective of the front of the rail vehicle system.

Figure 5C:
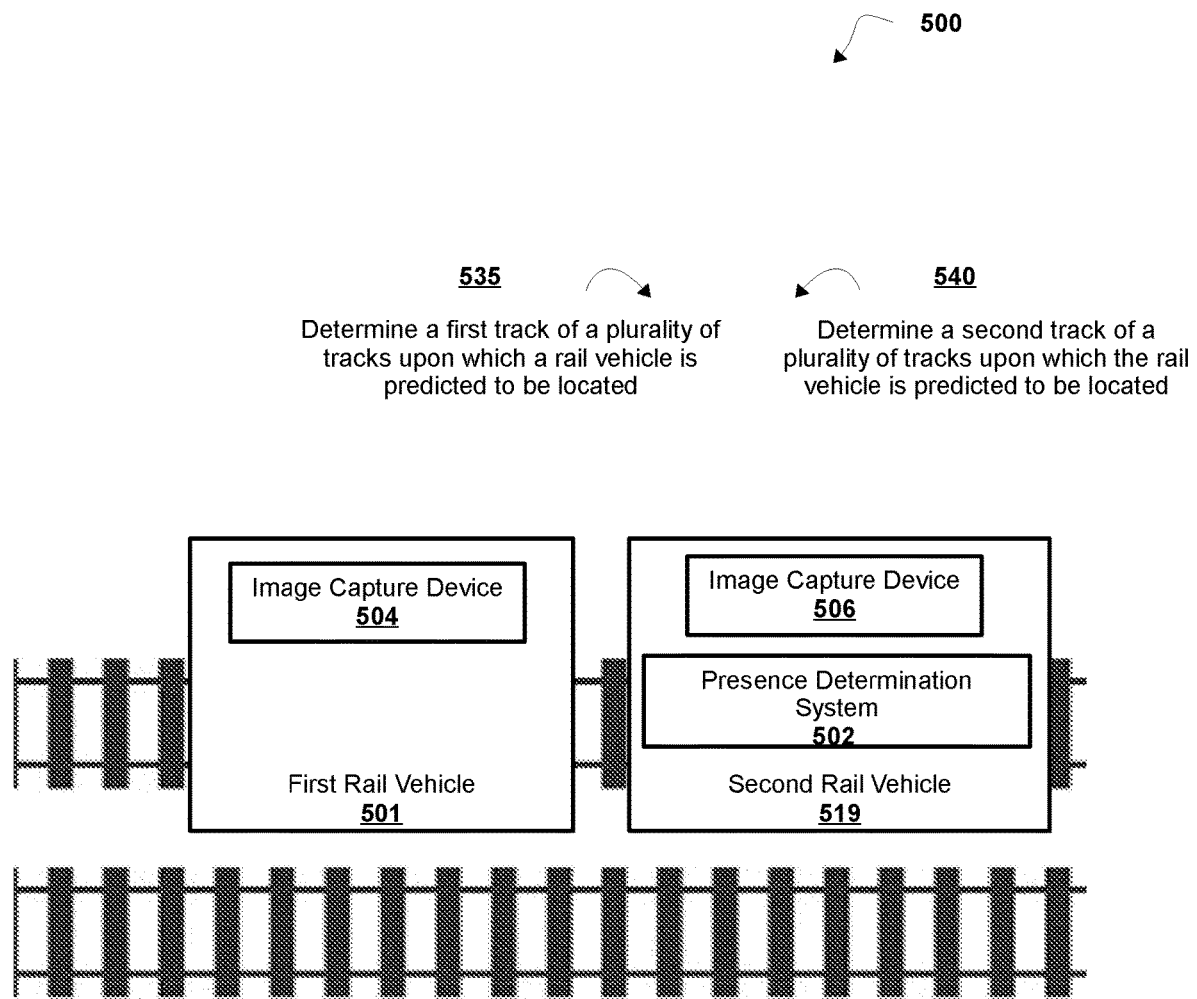

As shown by reference number 535 in FIG. 5C, presence determination system 502 may determine a first track (e.g., a position of a first track, an identification of a first track, etc.) of a plurality of tracks upon which a second rail vehicle 519 is predicted to be located. For example, presence determination system 102 may determine the first track of the plurality of tracks upon which second rail vehicle 519 is predicted to be located based on the first image data associated with the first image captured by the first image capture device 504. As further shown by reference number 540 in FIG. 5C, presence determination system 502 may determine a second track (e.g., a position of a second track, an identification of a second track, etc.) of a plurality of tracks upon which the second rail vehicle 519 is predicted to be located. For example, presence determination system 102 may determine the first track of the plurality of tracks upon which second rail vehicle 519 is predicted to be located based on the first image data associated with the first image captured by the first image capture device 504.

Figure 5D:
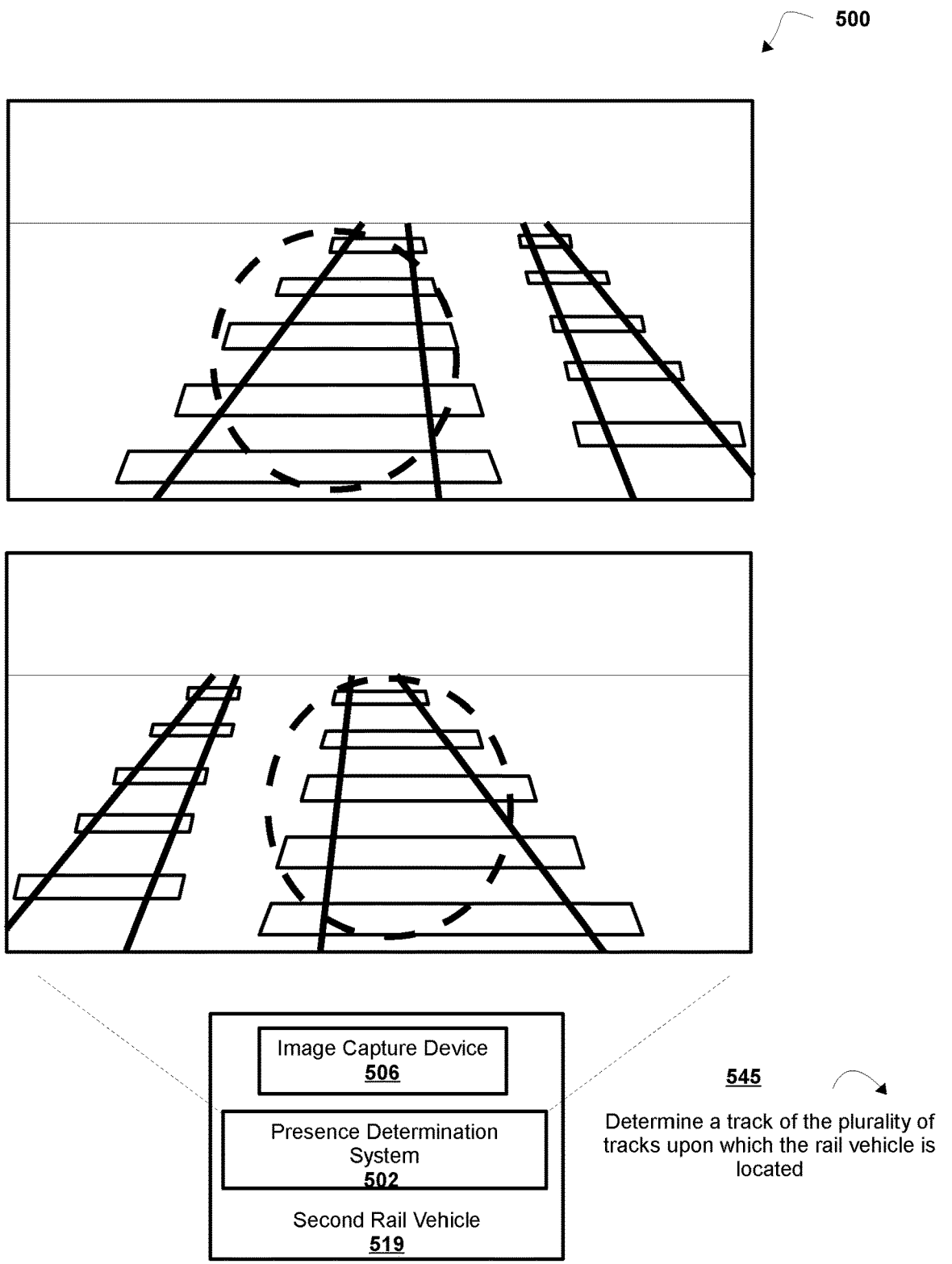

As shown by reference number 545 in FIG. 5D, presence determination system 502 may determine a track (e.g., a position of a track, an identification of a track, etc.) of the plurality of tracks upon which the second rail vehicle 519 is located based on the first track of the plurality of tracks upon which the rail vehicle is predicted to be located and the second track of the plurality of tracks upon which the rail vehicle is predicted to be located. For example, presence determination system 502 may determine a track of the plurality of tracks upon which second rail vehicle 519 is located based on determining that the first track of the plurality of tracks upon which the rail vehicle is predicted to be located matches the second track of the plurality of tracks upon which the rail vehicle is predicted to be located.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A system comprising:
    a first image capture device located at a first location on a first rail vehicle of a rail vehicle system;
    a second image capture device located at a second location on a second rail vehicle of the rail vehicle system; and
    one or more processors programmed or configured to:
        receive first image data associated with a first image captured by the first image capture device;
        receive second image data associated with a second image captured by the second image capture device;
        determine a first track of a plurality of tracks upon which the rail vehicle system is predicted to be located based on the first image data associated with the first image captured by the first image capture device;
        determine a second track of the plurality of tracks upon which the rail vehicle system is predicted to be located based on the second image data associated with the second image captured by the second image capture device; and
        determine a third track of the plurality of tracks upon which the rail vehicle system is located based on the first track of the plurality of tracks upon which the rail vehicle system is predicted to be located and the second track of the plurality of tracks upon which the rail vehicle system is predicted to be located.

2. The system of claim 1, wherein, when determining the third track of the plurality of tracks upon which the rail vehicle system is located, the one or more processors are programmed or configured to:
    determine that the first track of the plurality of tracks upon which the rail vehicle system is predicted to be located matches the second track of the plurality of tracks upon which the rail vehicle system is predicted to be located.

3. The system of claim 1, wherein the rail vehicle is a first rail vehicle of the rail vehicle system, wherein the first image capture device is a component of an end of train (EOT) unit of the first rail vehicle and the second image capture device is a component of a head of train (HOT) unit of the second rail vehicle of the rail vehicle system.

4. The system of claim 1, wherein, when receiving the first image data associated with the first image captured by the first image capture device, the one or more processors are configured to:
receive the first image data associated with the first image captured by the first image capture device based on a request.

5. The system of claim 1, wherein the one or more processors are further programmed or configured to:
determine a first number of rails for each track of the plurality of tracks in the first image based on the first image data associated with the first image captured by the first image capture device;
determine a second number of rails for each track of the plurality of tracks in the second image based on the second image data associated with the second image captured by the second image capture device; and
determine that the first number of rails for each track of the plurality of tracks in the first image corresponds to the second number of rails for each track of the plurality of tracks in the second image.

6. The system of claim 1, wherein the one or more processors are further programmed or configured to:
communicate data associated with the third track of the plurality of tracks upon which the rail vehicle system is located based on determining the third track of the plurality of tracks upon which the rail vehicle system is located.

7. A method comprising:
receiving, with one or more processors, first image data associated with a first image captured by a first image sensor, the first image sensor located at a first position on a rail vehicle;
receiving, with the one or more processors, second image data associated with a second image captured by a second image sensor, the second image sensor located at a second position, the second position being different than the first position;
determining, with the one or more processors, a first track of a plurality of tracks upon which the rail vehicle is predicted to be traveling based on the first image data associated with the first image captured by the first image sensor;
determining, with the one or more processors, a second track of the plurality of tracks upon which the rail vehicle is predicted to be traveling based on the second image data associated with the second image captured by the second image sensor;
determining a first number of rails in the first image based on the first image data associated with the first image captured by the first image sensor;
determining a second number of rails in the second image based on the second image data associated with the second image captured by the second image sensor;
determining that the first number of rails in the first image corresponds to the second number of rails in the second image; and
determining, with the one or more processors, a third track of the plurality of tracks upon which the rail vehicle is traveling based on determining the first track of the plurality of tracks upon which the rail vehicle is traveling and determining the second track of the plurality of tracks upon which the rail vehicle is traveling.

8. The method of claim 7, further comprising:
determining that the first track of a plurality of tracks upon which the rail vehicle is predicted to be traveling matches the second track of the plurality of tracks upon which the rail vehicle is predicted to be traveling.

9. The method of claim 7, further comprising:
communicating the first image data associated with the first image captured by a first image sensor by an end of train (EOT) unit, and wherein receiving the first image data associated with the first image captured by the first image sensor comprises:
receiving the first image data associated with the first image captured by the first image sensor from the EOT unit.

10. The method of claim 7, wherein the rail vehicle is a first rail vehicle of a rail vehicle system, wherein the first image capture device is a component of an end of train (EOT) unit of the first rail vehicle and the second image capture device is a component of a head of train (HOT) unit of a second rail vehicle of the rail vehicle system.

11. The method of claim 7, wherein the first image sensor is located at the first position on an end of train (EOT) unit of the rail vehicle and the second image sensor is located at the second position on a head of train (HOT) unit of the rail vehicle.

12. The method of claim 7, further comprising:
communicating data associated with the third track of the plurality of tracks upon which the rail vehicle is located based on determining the third track of the plurality of tracks upon which the rail vehicle is located.

13. A computer program product comprising at least one non-transitory computer-readable medium including one or more instructions that, when executed by one or more processors, direct the one or more processors to:
receive first image data associated with a first image captured by a first image capture device;
receive second image data associated with a second image captured by a second image capture device;
determine a first track of a plurality of tracks upon which a rail vehicle is predicted to be located based on the first image data associated with the first image captured by the first image capture device;
determine a second track of the plurality of tracks upon which the rail vehicle is predicted to be located based on the second image data associated with the second image captured by the second image capture device;
determine a first number of rails in the first image based on the first image data associated with the first image captured by the first image capture device;
determine a second number of rails in the second image based on the second image data associated with the second image captured by the second image capture device; and
determine that the first number of rails in the first image corresponds to the second number of rails in the second image; and
determine a third track of the plurality of tracks upon which the rail vehicle is located based on the first track of the plurality of tracks upon which the rail vehicle is predicted to be located and the second track of the plurality of tracks upon which the rail vehicle is predicted to be located.

14. The computer program product of claim 13, wherein the one or more instructions further direct the one or more processors to:
determine that the first track of the plurality of tracks upon which the rail vehicle is predicted to be located matches the second track of the plurality of tracks upon which the rail vehicle is predicted to be located.

15. The computer program product of claim 13, wherein the rail vehicle is a first rail vehicle of a rail vehicle system, and wherein the one or more instructions direct the one or more processors to:
  receive the first image data associated with the first image captured by the first image capture device from an end of train (EOT) unit of a second rail vehicle of the rail vehicle system.

16. The computer program product of claim 13, wherein the one or more instructions further direct the one or more processors to:
  communicate data associated with the third track of the plurality of tracks upon which the rail vehicle is located based on determining the third track of the plurality of tracks upon which the rail vehicle is located.

17. The computer program product of claim 16, wherein the one or more instructions direct the one or more processors to:
  communicate data associated with the third track of the plurality of tracks upon which the rail vehicle is travelling.

* * * * *

UNITED STATES PATENT AND TRADEMARK OFFICE
CERTIFICATE OF CORRECTION

PATENT NO. : 10,878,250 B2
APPLICATION NO. : 16/225707
DATED : December 29, 2020
INVENTOR(S) : Jeffrey D. Kernwein It is certified that error appears in the above-identified patent and that said Letters Patent is hereby corrected as shown below:

In the Claims

In Claim 3 at Column 20, Lines 64-65, the portion reading "claim 1, wherein the rail vehicle is a first rail vehicle of the rail vehicle system, wherein" should read --claim 1, wherein--.

In Claim 8 at Column 22, Line 2, the portion reading "the first track of a plurality of tracks" should read --the first track of the plurality of tracks--.

In Claim 17 at Column 23, Line 21, the portion reading "communicate data" should read --communicate the data--.

Signed and Sealed this
Sixteenth Day of August, 2022

Katherine Kelly Vidal
*Director of the United States Patent and Trademark Office*